United States Patent [19]
Hughes

[11] 3,731,967
[45] May 8, 1973

[54] ROOF WALKWAY FOR TRUCK CABS

[75] Inventor: Donald L. Hughes, Berea, Ohio

[73] Assignee: Sealed-Unit Service, Inc., Cleveland, Ohio

[22] Filed: Aug. 25, 1971

[21] Appl. No.: 174,902

[52] U.S. Cl. ............296/1 R, 105/457, 224/42.1 E, 280/150 R, 296/28 C
[51] Int. Cl. .............................................B60r 9/04
[58] Field of Search ..................296/1 R, 28 C, 28 M; 105/457, 458, 459; 224/42.1 R, 42.1 E, 42.1 D, 42.1 G; 280/150 R; 248/293; 52/177; 14/1, 14, 72

[56] References Cited

UNITED STATES PATENTS

| | | | |
|---|---|---|---|
| 1,300,199 | 4/1919 | Schrader | 105/457 |
| 2,775,381 | 12/1956 | Hare | 224/42.1 E |
| 1,512,775 | 10/1924 | Little | 105/457 |
| 1,839,440 | 1/1932 | Reed | 105/457 |
| 2,683,265 | 7/1954 | Wayne | 224/42.1 E X |
| 2,771,231 | 11/1956 | Hare | 224/42.1 E |

FOREIGN PATENTS OR APPLICATIONS 1,172,973   12/1969   Great Britain ...................224/42.1 E

*Primary Examiner*—Leo Friaglia
*Assistant Examiner*—Leslie J. Paperner
*Attorney*—Robert L. Hart

[57] ABSTRACT

A walkway with universal mounting means for mounting on the top of truck cabs and the like of different sizes and shapes. The walkway has a platform with receptacles at each end that receive a slidable bar on the top of each of four legs. The legs may be adjusted in the sockets to various spacings depending on the width of the cab. Mounting brackets are secured to opposite sides of the cab top usually at the curved edge portions thereof so as to transfer the load of the walkway as directly as possible to the cab frame. The legs are connected to the brackets by bolts at connection points located along an axis at each end of the walkway so that any number of tilted positions of the mounting brackets can be accomodated depending on the curvature at the edge of the cab.

3 Claims, 5 Drawing Figures

PATENTED MAY 8 1973 3,731,967

ROOF WALKWAY FOR TRUCK CABS

BACKGROUND OF THE INVENTION

This invention relates to walkways, platforms, decks and the like and especially to a walkway to be mounted on the top of a truck cab to support a person on top of the cab so as to provide access to equipment located, for example, on a trailer being towed by the truck.

More particularly the invention relates to a universal mounting means for a truck cab walkway, that permits mounting of the legs of the walkway at the side edges of the cab as close as possible to the frame structure of the cab and on various curved or sloping surfaces depending on the configuration of the roof of the truck cab.

Many types of trucks and trailers have equipment located at the exterior of the front end of the freight compartment above the cab. For example, refrigeration units are often so located on refrigerated trucks. In order for the truck driver or mechanic to obtain access to such equipment he must climb onto the roof of the truck cab which is normally not constructed for carrying the weight of a man. This practice is particularly hazardous when the roof of the cab is covered with rain, ice, or snow, or when the cab roof has deposits of oil thereon. Also this practice can result in dents and scratches on the exterior finish of the cab roof.

The present invention satisfies the difficulties described above and affords other features and advantages not obtainable from the prior art.

SUMMARY OF THE INVENTION

It is among the objects of the invention to support a person on the top of a truck cab with the resulting load applied more directly to the frame structure of the truck cab rather than directly to the roof of the cab.

Another object is to mount a walkway to a truck cab roof in such a way as to accommodate curved surfaces of certain configurations at the point of attaching the walkway to the truck cab.

A further object is to provide a walkway with a slip resisting supporting surface, from the top of a truck cab, which walkway has universal means for mounting it on truck cabs of a great variety of different dimensions and shapes.

Still another object is to provide an adjustable universal mounting means for a truck cab walkway to be located over the roof of the cab, such that a walkway of one design and construction is adaptable for mounting on different types and makes of truck cabs having a great variety of different sizes and surface configurations.

These and other objects are accomplished by means of a walkway that defines a perforated or grate type supporting surface and a universal mounting means therefor. The assembly comprises mounting brackets, adapted to be secured to the top of the truck cab at each side thereof, and having a flat surface that bears against the exterior surface of the cab adjacent the frame structure such as is usually integral with the side of the cab. A rigid platform adapted to extend laterally across the truck cab from side to side is supported by a pair of spaced legs at each end of the platform. Each pair of legs has the respective bottom ends thereof fastened to the respective mounting bracket at connection points located along an axis at each end parallel to the surface. The upper ends of the legs are attachable to the platform at any number of different locations according to the circumstances, along the longitudinal sides of the platform.

With this arrangement the brackets may be positioned on a great variety of surfaces having different slopes and configurations at the side of the truck cab. In other words, a radial line from the aforesaid connection axis, normal to the surface may be at any number of different angles relative to the upright legs in order to accommodate the particular surface configuration at the side of the cab top.

The spacing between the parallel axes of connection at opposite sides of the truck cab is accommodated by the provision of means to selectively connect the legs to the platform at the desired spacing dictated by the location and orientation of the brackets.

The rigid platform defines an open grate type surface which may be formed, for example, by cutting spaced parallel slits in sheet metal to be used for the platform and then twisting the metal strips between slits as much as 90° to form open spaces and also to form a high friction supporting surface for persons standing on the walkway.

According to the preferred embodiment the longitudinal sides of the platform are bent downwardly and inwardly to form a U-shaped, rectangular channels and the legs are formed of sections of square tubing welded in a right angle or L-shaped form. The horizontal leg is then inserted in the U-shaped slot with the other leg extending downwardly for connection to the bracket. The upper or horizontal portions of the legs may then be slid to any number of different locations in the slots to accommodate the spacing between connection points on opposite sides of the cab.

BRIEF DESCRIPTION OF THE DRAWINGS

Referring more particularly to the drawings.

DESCRIPTION OF THE PREFERRED EMBODIMENT

Figure 1:
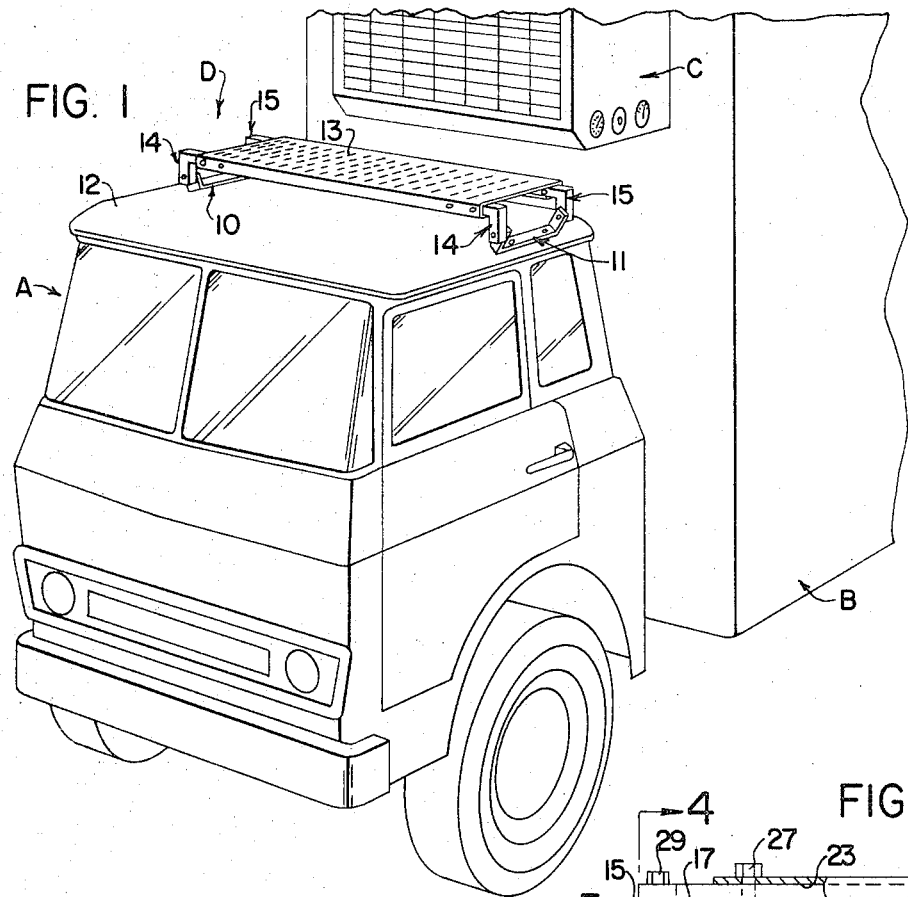
FIG. 1 is a fragmentary perspective view of the truck cab and trailer with a walkway embodying the invention attached to the top of the truck cab.
Figure 2:
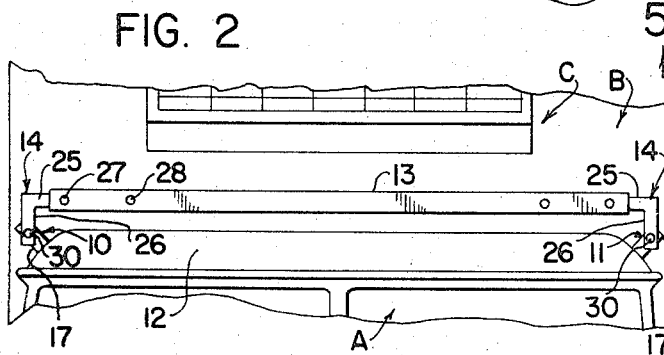
FIG. 2 is a fragmentary front elevation view of one end of the cab and walkway of FIG. 1.
Figure 3:
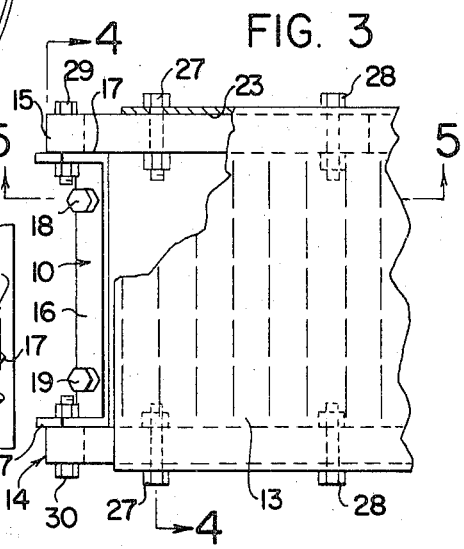
FIG. 3 is an enlarged fragmentary plan view of the walkway of FIGS. 1 and 2.
Figure 4:
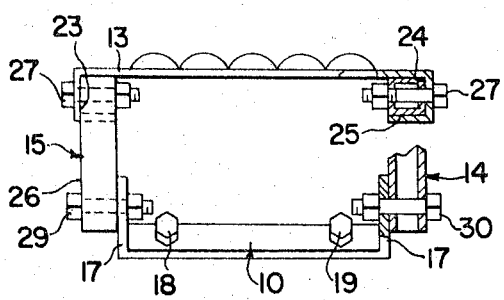
FIG. 4 is a sectional view taken on the line 4—4 of FIG. 3.
Figure 5:
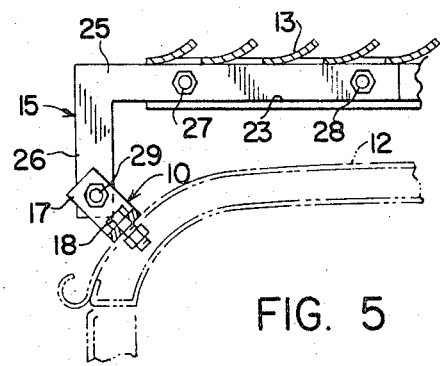
FIG. 5 is a sectional view taken on the line 5—5 of FIG. 3.

Referring more particularly to the drawings there are shown, a truck cab A connected to a refrigerated truck body having a refrigeration unit C located thereon and spaced above the top of the truck cab A. In order to provide access to the refrigeration unit C, which requires setting of controls, maintainence, adjustment and the like by a mechanic or by the truck driver during transit, there is provided a walkway D constructed and mounted in accordance with the invention.

The walkway D generally comprises a pair of mounting brackets 10 and 11 located at opposite sides of the top 12 of the truck cab A and a rigid platform 13 spaced from the roof of the top 11 of the truck cab A and supported by a pair of legs 14 and 15, at each end of the platform 13. The legs 14 and 15 of each pair are identified by corresponding numbers and the since the mounting and construction at each end of the walkway D is essentially identical, for the purpose of this description, reference will be made only to the construction at one side of the platform.

Each of the brackets 10 and 11 is of U-shaped form and has a flat span 16 between spaced upright lugs 17. The bottom surface of the span 16 bears against the top of the cab A usually along a curved surface at the edge of the roof so that it may be located as closely as possible to the frame structure which is usually integral with the side walls of the cab.

The brackets 10 and 11 are secured to the cab roof 12 by means of sheet metal screws or bolts 18 and 19 which extend through openings in the central span 16 of the bracket and which grip the sheet metal roof or more preferably which extend through the roof and are bolted thereto using nuts threaded onto the ends of bolts 18 and 19 within the cab. The upright lugs 17 have holes formed in their outer ends that are positioned parallel to the central span 16, on an axis. The platform 13 has a grate formed therein to provide a gripping surface which is being formed by cutting parallel slits from side in the platform and twisting the strips between the slits roughly 90° so as to define a fairly high friction supporting grate. The opposite longitudinal sides of the platform are bent downwardly and inwardly to define U-shaped channels 23 and 24 below the surface of the platform. The channels 23 and 24 are of rectangular form and are adapted to receive the upper portions of the legs 14 and 15 in a manner to be described below. Bolt holes are drilled in the side of each channel 23 and 24 for securing the legs 14 and 15 as will also be described below. In the particular embodiment shown, the platform 13 has surface dimensions of about 14 inches by 60 inches.

The legs 14 and 15 are of tubular rectangular form and include upper and lower portions 25 and 26 connected together such as by welding, at right angles. The lower portion 26 is adapted to be positioned vertically and the upper portion 25 is adapted to be received in one of the channels 23 and 24 so that it can be slid therein to the desired mounting position. When it is in the desired position holes are drilled therethrough to match pre-drilled holes in the channels 23 and 24 and bolts 27 and 28 are inserted therethrough for making a rigid connection.

Each of the lower portions 26 has a hole drilled therethrough, and adapted to match the bolt holes in the upright lugs 17 of the respective mounting bracket 10 or 11 and adapted to receive bolts 29 and 30. Since the bolts 29 and 30 are positioned such that they are coaxially aligned, the respective bracket 10 or 11 may be positioned at any number of angles relative to the respective legs 14 and 15 depending upon the particular curvature of the cab roof 12 of the truck cab A.

In the assembly and mounting of the walkway unit D on the roof 12 of the truck cab A the brackets 10 and 11 are first secured to opposite sides of the cab roof at the desired locations preferably as closely adjacent to the frame structure of the cab as possible. Normally the brackets will be located at a sloping portion of the cab roof so that the upright lugs 17 will not be vertical but rather will extend diagonally, normal to the underlying curved portion of the cab roof 12.

Next, the upper portions 25 of the legs 14 and 15 of each pair are inserted in the opposite ends of the channels 23 and 24 formed in the platform 13. The upper portions 25 are forced into the respective channels 23 and 24 until the lower portions 26 of the legs 14 and 15 are at the approximate spacing between the brackets 20 and 21.

Then the lower portions 26 of the legs 14 and 15 of one pair of legs are bolted to the respective bracket 10 or 11 at one side of the truck cab roof 12 using the bolts 29 and 30. Since the bolts 29 and 30 at the particular side where the initial connection is made are coaxially positioned, the platform may be pivoted about the respective axis as needed. When this connection has been completed, the legs 14 and 15 at the opposite side of the platform 13 are adjusted in the opposite ends of the channels 23 and 24 until the holes in the lower portions thereof are aligned with the holes in the upright lugs 17 of the respective other bracket 10 or 11.

When the proper adjustment of the upper portions 25 of the legs 14 and 15 has been made, the legs 14 and 15 are attached to the respective bracket using bolts 29 and 30. When this much of the assembly has been completed the platform 13 may be moved relative to the upper portions 25 of the legs 14 and 15 so that it is properly centered as desired above the cab roof 12. When it is in the correct centered position holes may be drilled in the upper portions 25 of the legs 14 and 15 in registration with the holes in the channels 23 and 24 so that the platform 13 may be tightly and rigidly connected to the legs 14 and 15 with bolts 27 and 28. When this has been completed, all of the bolts may be tightened down as necessary.

It will be seen that the above capability for assembly has universal application to a great many styles and makes of truck cabs and that the platform 13 will be safely and substantially supported since the point of connection of the platform 13 of the walkway D to the truck cab is closely adjacent the sides of the cab where the frame structure of the cab A and its roof 12 are located.

While the invention has been shown and described with respect to a specific embodiment thereof this is intended for the purpose of illustration rather than limitation and other variations and modifications of the structure herein shown and described will be apparent to those skilled in the art upon a reading of the specification and claims. Accordingly, the invention is not be limited to the particular form herein shown and described nor in any other way that is inconsistant with the extent to which the progress in the art has been advanced by the invention.

I claim:

1. A walkway for the top of truck cabs and the like comprising:

a pair of mounting brackets adapted to be permanently anchored to the top of a truck cab one at each side thereof, each bracket comprising a flat metal strip with ends upturned perpendicularly to provide a pair of spaced coaxial connection points and having a flat surface in its central span that bears against the cab exterior surface adjacent the frame structure at the side of the cab, a rigid one-piece platform adapted to span the top of a truck cab from side-to-side, and having integral open channels along and beneath the longitudinal sides thereof, a pair of spaced legs at each end of said platform each pair having their respective bottom ends fastened to the respective bracket at said connection points located along an axis at each end parallel to said surface and having their respective upper ends slidably received in said channels and selectively attachable therein at one of a plurality of locations, whereby said brackets may be positioned relative to said legs so that a radial line from said axis normal to said surface is angularly disposed relative to said legs as may be necessary to accommodate the particular surface configuration at the side of the cab top.

2. A walkway as defined in claim 1 wherein said legs have the form of an inverted "L" and wherein the horizontal arm of each leg is slidably inserted in one open end of one of said channels.

3. A walkway as defined in claim 2 wherein said legs are of rectangular tubular construction.

* * * * *